(12) United States Patent
Bacallao

(10) Patent No.: US 10,513,282 B2
(45) Date of Patent: *Dec. 24, 2019

(54) SHOPPING CART BAGGING STATION AND METHOD OF FORMING THE SAME

(71) Applicant: Walmart Apollo, LLC, Bentonville, AR (US)

(72) Inventor: Yurgis Mauro Bacallao, Centerton, AR (US)

(73) Assignee: WALMART APOLLO, LLC, Bentonville, AR (US)

(*) Notice: Subject to any disclaimer, the term of this patent is extended or adjusted under 35 U.S.C. 154(b) by 21 days.

This patent is subject to a terminal disclaimer.

(21) Appl. No.: 15/676,218

(22) Filed: Aug. 14, 2017

(65) Prior Publication Data

US 2018/0049564 A1 Feb. 22, 2018

Related U.S. Application Data

(60) Provisional application No. 62/377,135, filed on Aug. 19, 2016, provisional application No. 62/377,143, filed on Aug. 19, 2016.

(51) Int. Cl.
*B62B 3/14* (2006.01)
*B62B 3/10* (2006.01)
(Continued)

(52) U.S. Cl.
CPC .......... *B62B 3/106* (2013.01); *A47F 13/085* (2013.01); *B62B 3/14* (2013.01); *B62B 3/146* (2013.01);
(Continued)

(58) Field of Classification Search
CPC ......... B62B 3/1464; B62B 5/00; B62B 1/266; B62B 3/10; B62B 3/106; B62B 3/146;
(Continued)

(56) References Cited

U.S. PATENT DOCUMENTS

| 259,932 A | 6/1882 | Sims |
| 370,563 A | 9/1887 | Simmons |

(Continued)

FOREIGN PATENT DOCUMENTS

| AU | 1142402 A1 | 4/2002 |
| AU | 2002364902 A1 | 5/2004 |

(Continued)

OTHER PUBLICATIONS

Search Report in UK Patent Application No. GB1621562.6, dated Jun. 14, 2017; 4 pages.

(Continued)

*Primary Examiner* — Jeffrey A Shapiro
(74) *Attorney, Agent, or Firm* — Schmeiser, Olsen & Watts LLP; Karen E. Jachimowicz

(57) ABSTRACT

A shopping cart bagging station that couples to a shopping cart is described. The shopping cart bagging station includes a center piece, a first and a second handle arm assembly, and a shopping cart coupler assembly. The center piece includes a bag holder hook that holds at least one shopping bag. The first and the second handle arm assembly each include a handle holder arm that holds the arms of one or more shopping bag. The first and the second handle arm assemblies slidingly insert into a hollow body of the center piece and are adjustably coupled to the center piece. The shopping cart coupler assembly couples the bagging station to a shopping cart. The shopping cart bagging station can be mounted in various locations on a shopping cart, making it easy and convenient for a customer to carry and load a number of shopping bags as they shop.

16 Claims, 10 Drawing Sheets

(51) Int. Cl.
*B65B 67/12* (2006.01)
*A47F 13/08* (2006.01)
*B62B 5/00* (2006.01)

(52) U.S. Cl.
CPC .............. *B62B 3/1464* (2013.01); *B62B 5/00* (2013.01); *B65B 67/1205* (2013.01); *B65B 67/1227* (2013.01); *B65B 67/1266* (2013.01)

(58) Field of Classification Search
CPC ..... B62B 3/1472; B62B 9/26; B62B 2202/22; B62B 2202/26; B62B 2202/404; B65B 67/1227; B65B 67/1266; B65B 67/1205; B65B 2067/1294; A47F 9/042; A47F 13/085
USPC .... 224/411, 560, 925; 383/6, 22–25, 33, 34, 383/101; 248/95–101, 122.1, 163.1, 248/200.1, 202.1, 261, 263, 274.1, 248/339–341, 424, 429, 476, 690, 692; 211/12, 85.15, 85.19, 85.29, 94.01, 96, 211/99, 105.03, 106, 119, 123, 162, 168, 211/170, 171, 175; 280/33.991, 33.992, 280/33.997, 33.995; 186/52, 66, 67
See application file for complete search history.

(56) References Cited

U.S. PATENT DOCUMENTS

| | | |
|---|---|---|
| 477,235 A | 6/1892 | Timmerman |
| 562,229 A | 6/1896 | Lenney |
| 635,100 A | 10/1899 | Huebel |
| 765,388 A | 7/1904 | Lanpher |
| 797,871 A | 8/1905 | Smith |
| 809,568 A | 1/1906 | Hulburt |
| 873,188 A | 12/1907 | Thumann |
| 890,693 A | 6/1908 | McCoy |
| 893,930 A | 7/1908 | Lederman |
| 896,443 A | 8/1908 | Dyett |
| 936,736 A | 10/1909 | Porter et al. |
| 995,798 A | 6/1911 | McCullough |
| 1,055,745 A | 3/1913 | Harrison |
| 1,069,108 A | 8/1913 | Buhl |
| 1,252,740 A | 1/1918 | Thornblade |
| 1,281,656 A | 10/1918 | Raschick |
| 1,284,579 A | 11/1918 | Brown |
| 1,653,393 A | 12/1927 | Cox |
| 1,662,140 A | 3/1928 | Whitesides |
| 2,240,629 A | 5/1941 | Smith |
| 2,305,863 A | 12/1942 | Ginter |
| 2,498,446 A | 2/1950 | Pawsat |
| 2,563,679 A | 8/1951 | Hardy |
| 2,603,438 A | 7/1952 | Adams |
| 2,682,956 A | 7/1954 | Pike |
| 2,797,058 A | 6/1957 | Packham |
| 2,998,955 A * | 9/1961 | Hertzog .................. A47H 1/122 248/263 |
| 3,133,660 A | 5/1964 | Roberts |
| 3,266,742 A | 8/1966 | Pena |
| 3,313,504 A | 4/1967 | Thorkild |
| 3,339,745 A | 9/1967 | Sugerman |
| D209,279 S | 11/1967 | Cohen |
| 3,438,644 A | 4/1969 | Kaplan et al. |
| 3,475,067 A | 10/1969 | Girard |
| 3,747,298 A | 7/1973 | Lieberman |
| 3,861,630 A | 1/1975 | Ady |
| 3,930,696 A | 1/1976 | Hight et al. |
| 3,943,859 A | 3/1976 | Boone |
| 3,995,803 A | 12/1976 | Llitz |
| 4,048,754 A | 9/1977 | Laux |
| 4,082,939 A | 4/1978 | Walters |
| 4,106,617 A | 8/1978 | Boone |
| 4,269,336 A | 5/1981 | Humlong |
| 4,305,558 A | 12/1981 | Baker |
| 4,354,643 A | 10/1982 | Kenner |
| 4,367,819 A | 1/1983 | Lewis |
| 4,376,502 A | 3/1983 | Cohen |
| 4,398,689 A | 8/1983 | Prader |
| 4,403,807 A | 9/1983 | Wilkinson et al. |
| 4,456,125 A | 6/1984 | Chap |
| 4,480,810 A * | 11/1984 | Hall .................. E06C 7/14 182/129 |
| 4,576,388 A * | 3/1986 | Pope .................. B62B 3/1464 248/100 |
| 4,583,753 A | 4/1986 | Economy |
| 4,595,153 A | 6/1986 | Goetz |
| 4,655,409 A | 4/1987 | Zima |
| 4,682,782 A | 7/1987 | Mills |
| 4,702,402 A | 10/1987 | Ferri |
| 4,728,070 A | 3/1988 | Engelbrecht |
| 4,838,504 A | 6/1989 | Bittenbinder |
| 4,840,336 A | 6/1989 | Stroh et al. |
| D302,062 S | 7/1989 | Sable |
| 4,858,862 A | 8/1989 | Prader |
| 4,863,125 A | 9/1989 | Bateman |
| 4,881,577 A | 11/1989 | Stroh et al. |
| 4,881,706 A | 11/1989 | Sedlik |
| 4,968,047 A | 11/1990 | Ferris |
| 4,974,799 A | 12/1990 | Palmer |
| 4,997,149 A | 3/1991 | Koch |
| 4,998,647 A | 3/1991 | Sharp |
| 4,998,694 A | 3/1991 | Barteaux |
| 5,002,215 A | 3/1991 | Gregoire |
| 5,005,791 A | 4/1991 | Lanzen |
| 5,190,253 A | 3/1993 | Sable |
| 5,362,077 A | 11/1994 | Adamson |
| 5,366,123 A | 11/1994 | Range |
| 5,374,577 A | 12/1994 | Tuan |
| 5,385,318 A | 1/1995 | Rizzuto |
| 5,390,443 A | 2/1995 | Emalfarb et al. |
| 5,427,288 A * | 6/1995 | Trubee .................. B60R 7/02 224/539 |
| 5,437,346 A | 8/1995 | Dumont |
| 5,439,120 A | 8/1995 | Brozak |
| 5,443,173 A | 8/1995 | Emery et al. |
| D363,208 S | 10/1995 | Seidel |
| 5,460,279 A | 10/1995 | Emery et al. |
| 5,465,846 A | 11/1995 | Blyth et al. |
| 5,503,297 A * | 4/1996 | Frankel .............. A47G 23/0225 220/737 |
| 5,513,823 A | 5/1996 | Bresnahan |
| 5,531,366 A | 7/1996 | Strom |
| 5,533,361 A | 7/1996 | Halpem |
| 5,564,566 A | 10/1996 | Lamb |
| 5,618,008 A | 4/1997 | Dearwester et al. |
| 5,704,497 A | 1/1998 | Wyatt |
| 5,727,721 A | 3/1998 | Guido et al. |
| D396,372 S | 7/1998 | Goodman |
| 5,836,486 A | 11/1998 | Ohsugi |
| 5,875,902 A | 3/1999 | Emery et al. |
| 5,915,584 A | 6/1999 | Sposit et al. |
| D412,080 S | 7/1999 | Emery et al. |
| 5,924,573 A | 7/1999 | Piraneo et al. |
| 5,979,841 A | 11/1999 | Piraneo et al. |
| 6,018,397 A | 1/2000 | Cloutier et al. |
| 6,041,945 A | 3/2000 | Faraj |
| 6,086,023 A | 7/2000 | Kerr et al. |
| 6,109,462 A | 8/2000 | Emalfarb et al. |
| 6,152,408 A | 11/2000 | O'Grady |
| 6,155,521 A | 12/2000 | O'hanlon |
| 6,170,679 B1 | 1/2001 | Frye |
| 6,193,265 B1 | 2/2001 | Yemini |
| 6,264,035 B1 | 7/2001 | Petrie |
| 6,299,001 B1 | 10/2001 | Frolov et al. |
| 6,305,572 B1 | 10/2001 | Daniels et al. |
| D452,944 S | 1/2002 | Schmidt |
| 6,341,704 B1 | 1/2002 | Michel, Jr. |
| 6,364,266 B1 | 4/2002 | Garvin |
| 6,390,422 B2 | 5/2002 | Banko |
| 6,409,031 B1 | 6/2002 | Wynne |
| D459,979 S | 7/2002 | Goodman |
| 6,481,583 B1 | 11/2002 | Black et al. |
| 6,543,638 B2 | 4/2003 | Wile |
| 6,561,403 B1 | 5/2003 | Kannankeril et al. |

(56) References Cited

U.S. PATENT DOCUMENTS

| | | |
|---|---|---|
| 6,601,759 B2 | 8/2003 | Fife et al. |
| 6,606,411 B1 | 8/2003 | Loui et al. |
| 6,607,229 B1 | 8/2003 | McIntosh |
| 6,648,265 B2 | 11/2003 | Goldberg |
| 6,655,537 B1 | 12/2003 | Lang et al. |
| 6,685,075 B1 | 2/2004 | Kannankeril |
| 6,726,145 B1 | 4/2004 | Kraus |
| 6,726,156 B1 | 4/2004 | Scola |
| D490,691 S | 6/2004 | Buss et al. |
| 6,745,186 B1 | 6/2004 | Testa et al. |
| 6,789,687 B2 | 9/2004 | Cramer |
| 6,805,271 B2 | 10/2004 | Holden |
| 6,810,149 B1 | 10/2004 | Squilla et al. |
| 6,832,739 B1 | 12/2004 | Kraus |
| 6,886,101 B2 | 4/2005 | Glazer et al. |
| 6,937,989 B2 | 8/2005 | Mcintyre et al. |
| 7,066,389 B2 | 6/2006 | Dickover et al. |
| 7,077,612 B1 | 7/2006 | Giggle, III et al. |
| 7,128,251 B1 | 10/2006 | Galle |
| 7,172,092 B2 | 2/2007 | Yang et al. |
| 7,177,820 B2 | 2/2007 | Mcintyre et al. |
| 7,182,210 B2 | 2/2007 | Metcalf |
| 7,192,035 B1 | 3/2007 | Lioce |
| D540,591 S | 4/2007 | Snell |
| 7,222,363 B2 | 5/2007 | Rice et al. |
| D552,901 S | 10/2007 | Wilfong, Jr. et al. |
| D571,518 S | 6/2008 | Waldman |
| D575,973 S | 9/2008 | Goodman et al. |
| 7,431,208 B2 | 10/2008 | Feldman et al. |
| 7,475,885 B2 | 1/2009 | Kovath |
| 7,530,537 B2 | 5/2009 | Kandah |
| 7,587,756 B2 | 9/2009 | Peart et al. |
| 7,610,717 B2 | 11/2009 | Luken et al. |
| 7,654,409 B2 | 2/2010 | Hoffman |
| 7,677,507 B1 | 3/2010 | Rothbauer et al. |
| 7,716,064 B2 | 5/2010 | Mcintyre et al. |
| D616,680 S | 6/2010 | Snider |
| 7,789,248 B1 * | 9/2010 | Salerno ............... A47G 25/08 211/85.7 |
| 7,850,014 B2 | 12/2010 | Nguyen et al. |
| 7,887,068 B2 | 2/2011 | Ferguson |
| 8,002,127 B2 * | 8/2011 | Ward ................... A47B 61/02 211/105.3 |
| 8,069,092 B2 | 11/2011 | Bryant |
| D650,209 S | 12/2011 | Snider |
| D654,737 S | 2/2012 | Guindi |
| 8,177,079 B2 | 5/2012 | Schwartzkopf et al. |
| D666,858 S | 9/2012 | Goodman |
| D667,250 S | 9/2012 | Goodman et al. |
| 8,292,094 B2 | 10/2012 | Morton |
| 8,336,800 B1 | 12/2012 | Lopez |
| 8,403,343 B1 | 3/2013 | Seawel |
| D689,282 S | 9/2013 | Lindeman |
| 8,572,712 B2 | 10/2013 | Rice et al. |
| D693,577 S | 11/2013 | Goodman et al. |
| 8,640,890 B2 | 2/2014 | Schiller |
| 8,668,207 B1 * | 3/2014 | Gilliam ................ G09F 23/06 280/33.992 |
| 8,746,640 B2 | 6/2014 | Broadley et al. |
| 8,814,039 B2 | 8/2014 | Bishop et al. |
| D713,663 S | 9/2014 | Pryor |
| 8,820,633 B2 | 9/2014 | Bishop et al. |
| 8,851,369 B2 | 10/2014 | Bishop et al. |
| D718,054 S | 11/2014 | Goodman et al. |
| D719,372 S | 12/2014 | Goodman et al. |
| 8,905,411 B1 | 12/2014 | Blanton |
| D720,538 S | 1/2015 | Goodman et al. |
| D728,255 S | 5/2015 | Guindi et al. |
| 9,199,656 B1 | 12/2015 | Tong et al. |
| D746,592 S | 1/2016 | Goodman et al. |
| D747,876 S | 1/2016 | Goodman et al. |
| D750,472 S | 3/2016 | Kuka |
| D751,763 S | 3/2016 | Goodman et al. |
| D784,721 S | 4/2017 | Goodman et al. |
| 9,623,995 B2 | 4/2017 | Tan |
| D785,333 S | 5/2017 | Goodman et al. |
| D785,369 S | 5/2017 | Goodman et al. |
| D787,303 S | 5/2017 | Garvin |
| 9,656,827 B2 | 5/2017 | Sudhir |
| 9,694,840 B2 * | 7/2017 | Hendrick ............. B62B 3/1464 |
| 9,737,141 B2 | 8/2017 | Johnson |
| D796,771 S | 9/2017 | Bacallao et al. |
| D803,032 S | 11/2017 | Jammehdiabadi |
| 9,844,283 B2 | 12/2017 | Bacallao |
| 10,173,708 B1 | 1/2019 | Bacallao |
| 10,179,599 B1 | 1/2019 | Lambrecht |
| 2001/0022333 A1 | 9/2001 | Banko |
| 2002/0060276 A1 | 5/2002 | Rosler |
| 2002/0145086 A1 | 10/2002 | Alvarado et al. |
| 2002/0170937 A1 | 11/2002 | Yeh et al. |
| 2002/0185510 A1 | 12/2002 | Holsclaw |
| 2002/0185513 A1 | 12/2002 | Morris |
| 2003/0000905 A1 | 1/2003 | Zidek |
| 2003/0042694 A1 | 3/2003 | Werner |
| 2003/0052464 A1 | 3/2003 | McGuire |
| 2003/0098326 A1 | 5/2003 | Wile |
| 2003/0121871 A1 | 7/2003 | Zadro |
| 2003/0198390 A1 | 10/2003 | Loui et al. |
| 2004/0000529 A1 | 1/2004 | Gladnick et al. |
| 2004/0000612 A1 | 1/2004 | Young |
| 2004/0026439 A1 | 2/2004 | Bolton |
| 2004/0075015 A1 | 4/2004 | Cain et al. |
| 2004/0104316 A1 | 6/2004 | Turvey |
| 2004/0124598 A1 | 7/2004 | Williams |
| 2004/0139398 A1 | 7/2004 | Testa et al. |
| 2004/0178298 A1 | 9/2004 | Kennard |
| 2004/0262385 A1 | 12/2004 | Blaeuer |
| 2005/0040615 A1 | 2/2005 | Frommherz |
| 2005/0056718 A1 | 3/2005 | Kamenstein |
| 2005/0205578 A1 | 9/2005 | Yeh |
| 2005/0284729 A1 | 12/2005 | LoRusso |
| 2006/0049591 A1 | 3/2006 | Pennell |
| 2006/0097467 A1 | 5/2006 | Solomon et al. |
| 2006/0124799 A1 | 6/2006 | Johnson |
| 2006/0226187 A1 | 10/2006 | Linker |
| 2007/0095769 A1 | 5/2007 | Jenkins |
| 2007/0176058 A1 | 8/2007 | Kohn |
| 2007/0186515 A1 | 8/2007 | Ruetten et al. |
| 2007/0204044 A1 | 8/2007 | Rice et al. |
| 2007/0261159 A1 | 11/2007 | Marks |
| 2007/0278359 A1 | 12/2007 | Kandah |
| 2008/0000910 A1 | 1/2008 | Gaillard |
| 2008/0001019 A1 | 1/2008 | Brown |
| 2008/0169253 A1 * | 7/2008 | Vitale .................. A47B 57/06 211/85.7 |
| 2008/0202851 A1 * | 8/2008 | Schwenke ............ E06C 7/48 182/107 |
| 2008/0215448 A1 | 9/2008 | Boyle et al. |
| 2008/0215449 A1 | 9/2008 | Boyle et al. |
| 2008/0217342 A1 | 9/2008 | Cinque |
| 2008/0245684 A1 | 10/2008 | Yeatman |
| 2009/0078731 A1 | 3/2009 | Yi |
| 2009/0078815 A1 | 3/2009 | Tong et al. |
| 2009/0092342 A1 | 4/2009 | Rolim de Oliveira |
| 2009/0184162 A1 | 7/2009 | Rice et al. |
| 2009/0261050 A1 | 10/2009 | Curren |
| 2009/0319352 A1 | 12/2009 | Boyle et al. |
| 2009/0327087 A1 | 12/2009 | Beck et al. |
| 2010/0096514 A1 | 4/2010 | Adair et al. |
| 2010/0102014 A1 | 4/2010 | Yang |
| 2010/0123050 A1 | 5/2010 | Astwood |
| 2010/0148019 A1 | 6/2010 | Simhaee |
| 2010/0206825 A1 * | 8/2010 | Johnston ............. A47F 5/0853 211/59.2 |
| 2010/0218370 A1 | 9/2010 | Lin |
| 2010/0219219 A1 | 9/2010 | Svetina |
| 2010/0264101 A1 | 10/2010 | Ma |
| 2010/0289234 A1 | 11/2010 | Sonnendorfer et al. |
| 2011/0266092 A1 | 11/2011 | Marquis et al. |
| 2012/0125970 A1 | 5/2012 | Tsui |
| 2012/0167182 A1 | 6/2012 | Rice et al. |
| 2012/0169020 A1 | 7/2012 | Farrell |
| 2012/0305618 A1 | 12/2012 | Tan |
| 2012/0305619 A1 | 12/2012 | Tan |

(56) References Cited

U.S. PATENT DOCUMENTS

| | | |
|---|---|---|
| 2013/0026120 A1 | 1/2013 | Johnson |
| 2013/0037665 A1 | 2/2013 | Brasell et al. |
| 2013/0048689 A1 | 2/2013 | Ling |
| 2013/0092804 A1 | 4/2013 | Laitila et al. |
| 2013/0134181 A1 | 5/2013 | Helseth et al. |
| 2013/0264242 A1 | 10/2013 | Wojno |
| 2013/0330163 A1 | 12/2013 | Marsh |
| 2014/0048576 A1 | 2/2014 | Tan |
| 2014/0131506 A1 | 5/2014 | Clarkin |
| 2014/0144966 A1 | 5/2014 | Tan |
| 2014/0209651 A1 | 7/2014 | Wilfong |
| 2014/0367507 A1 | 12/2014 | Trampolski |
| 2015/0048039 A1 | 2/2015 | Laitila et al. |
| 2016/0016752 A1 | 1/2016 | Helseth et al. |
| 2016/0096542 A1 | 4/2016 | Fukushima |
| 2016/0107668 A1 | 4/2016 | Robins |
| 2016/0183744 A1 | 6/2016 | Sadikov et al. |
| 2016/0227969 A1 | 8/2016 | Morris |
| 2016/0242605 A1 | 8/2016 | Heymann et al. |
| 2016/0270607 A1 | 9/2016 | Zeng |
| 2016/0300235 A1 | 10/2016 | Boyle et al. |
| 2016/0311454 A1* | 10/2016 | Hendrick ............. B62B 3/1464 |
| 2016/0367088 A1 | 12/2016 | Allard et al. |
| 2017/0066550 A1 | 3/2017 | Tsai |
| 2017/0172322 A1 | 6/2017 | Bacallao |
| 2017/0174242 A1 | 6/2017 | Bacallao |
| 2017/0174243 A1 | 6/2017 | Bacallao et al. |
| 2017/0197650 A1 | 7/2017 | Whistler |
| 2017/0259959 A1 | 9/2017 | Nilsson et al. |
| 2017/0267412 A1 | 9/2017 | Krause |
| 2017/0275126 A1 | 9/2017 | Sudhir |
| 2017/0325603 A1 | 11/2017 | Bacallao |
| 2017/0349200 A1 | 12/2017 | Winton et al. |
| 2018/0009460 A1 | 1/2018 | Bacallao et al. |
| 2018/0027994 A1 | 2/2018 | Bacallao et al. |
| 2018/0093690 A1 | 4/2018 | Bacallao et al. |

FOREIGN PATENT DOCUMENTS

| | | |
|---|---|---|
| AU | 2003272329 | 6/2004 |
| CA | 2789288 A1 | 3/2014 |
| CA | 2958358 A1 | 8/2017 |
| DE | 29806330 U | 7/1998 |
| EP | 1182859 A2 | 2/2002 |
| EP | 1510944 A1 | 3/2005 |
| EP | 2387772 A1 | 11/2011 |
| EP | 2438562 A1 | 4/2012 |
| GB | 2468351 A | 9/2010 |
| GB | 2547525 A1 | 8/2017 |
| JP | 2000112997 | 4/2000 |
| JP | 2007323453 A | 12/2007 |
| JP | 2008282412 A | 11/2008 |
| WO | 2002029702 | 4/2002 |
| WO | 2004042614 | 5/2004 |
| WO | 2004038997 | 6/2004 |
| WO | 2005094407 | 10/2005 |
| WO | 2006012538 | 2/2006 |
| WO | 2007141417 A1 | 12/2007 |
| WO | 2010083113 | 7/2010 |
| WO | 2011008625 | 1/2011 |
| WO | 2013079878 A1 | 6/2013 |

OTHER PUBLICATIONS

Search Report in UK Patent Application No. GB1621564.2 dated Jun. 15, 2017; 5 pages.
Search Report in UK Patent Application No. GB1702839.0 dated Jun. 14, 2017; 5 pages.
Notice of Allowance in U.S. Appl. No. 15/653,768, dated May 2, 2018; 12 pages.
Notice of Allowance in U.S. Appl. No. 15/703,307, dated May 23, 2018; 5 pages.
Non-Final Office Action in U.S. Appl. No. 15/383,126, dated May 16, 2018; 6 pages.
Notice of Allowance in U.S. Appl. No. 15/641,367, dated Jun. 7 2018; 5 pages.
Non-Final Office Action in U.S. Appl. No. 15/383,151, dated May 25 2018; 13 pages.
"Universal Double Car Vehicle Hangers/Hooks Grocery Bags/Handbags/Umbrellas Organizer—Black," DealsMachine.com, accessed on Oct. 15, 2015; 2 pages.
"Over-the-Door Hook 3 Hook InterDesign," Target.com, accessed on Oct. 15, 2015; 4 pages.
JoshM "Smart Shopping Cart: Bagging Station Design," EECS398SmartShoppingCart.blogspot.in, Mar. 22, 2015; 2 pages.
"Clear Suspended Ceiling Hook," DoItBest.com, accessed on Oct. 14, 2015; 3 pages.
"Industrial T-shirt Bag Stand—Just like Grocery Stores," SmallBizWarehouse.com, accessed on Oct. 14, 2015; 4 pages.
"Dual L-Shape Flash Bracket Holder Mount for Canon Nikon Speedlikte DSLR Camera," Amazon.com, accessed on Jan. 5, 2016; 5 pages.
"InterDesign Classico Over-the-Door Tie and Belt Rack," HoldnStorage.com, accessed on Nov. 22, 2016; 2 pages.
"Small Matte 'So-Hooked' Rack," The Container Store, accessed on Nov. 22, 2016; 2 pages.
"POS Check Out Plastic Bag Holder Dispenser FOR Retail Supermarket Brand New!" Ebay.com, accessed on Nov. 17, 2016; 5 pages.
"Lot 2 Royston Plastic Grocery Bag Holder Dispenser Stand Point of Sale Shopping," TeraPeak.com, accessed on Nov. 17, 2016; 3 pages.
"Bag Holders," ULINE.mx, accessed on Nov. 17, 2016; 1 page.
"OEM Express Checkout Counter / Customized Supermarket Cash Register Stands Counters," Guangzhou ECO Commerical Equipment Co., Ltd, SupermarketCheckoutCounters.com, accessed on Nov. 17, 2016; 3 pages.
"Retrospec Bicycles Detachable Steel Half-Mesh Apollo Bike Basket with Handles," Retrospec Bicycles, Amazon.com, accessed on Apr. 27, 2017; 1 page.
"Transport trolley / waste / with waste bag holder / 1-bag WASTY 70 LT Francehopital," MedicalExpo.com, accessed on Apr. 25, 2017; 25 pages.
Jackie, "How to Make a Clothespin Bag," TheHappyHousewife.com, Apr. 19, 2012; 14 pages.
"Gluman Combo of 12 Sparkle Clothes Hangers (Yellow) and 6 Plastic Kitchen Storage Containers Blue (125 ml)," PAYtm.com, accessed on Apr. 24, 2017; 3 pages.
"Pack-N-Tote Reusable Grocery Cart Bag, Hooks Directly to the Shopping Cart, Black," Six Mour Creations, Amazon.com, accessed on Apr. 24, 2017; 5 pages.
"Toygully 12 Pack Solid Steel Finish Hangers with Clips strong," PAYtm.com, accessed on Apr. 26, 2017; 3 pages.
Search Report in United Kingdom Patent Application No. GB1621567.5, dated Jun. 14, 2017; 5 pages.
Notice of Allowance in U.S. Appl. No. 29/572,901, dated May 17, 2017; 9 pages.
"Actionclub Wall Mount Grocery Bag Dispenser Kitchen Plastic Recycle Storage Box Garbage Bag Orangizer Container Holder," AliExpress.com, accessed on Jun. 14, 2017; 3 pages.
"BG001-0111 : Bag Dispenser—Single," BowmanDispensers.com, accessed on Jun. 14, 2017; 8 pages.
"Axis Chrome Over Cabinet Plastic Bag Holder," Organizelt.com, accessed on Jun. 14, 2017; 2 pages.
"simplehuman Stainless Steel Grocery Bag Holder," ContainerStore.com, accessed on Jun. 14, 2017; 2 pages.
Notice of Allowance in U.S. Appl. No. 16/053,248 dated Oct. 11, 2018; 7 pages.
Final Office Action in U.S. Appl. No. 15/383,126 dated Nov. 14, 2018; 6 pages.
Notice of Allowance in U.S. Appl. No. 15/383,170 dated Dec. 6, 2018; 5 pages.
Notice of Allowance in U.S. Appl. No. 15/383,151 dated Dec. 21, 2018; 9 pages.

(56) References Cited

OTHER PUBLICATIONS

Restriction Requirement in U.S. Appl. No. 15/433,365 dated Dec. 31, 2018; 5 pages.
Non-Final Office Action in U.S. Appl. No. 15/433,388 dated Dec. 31, 2018; 6 pages.
Non-Final Office Action in U.S. Appl. No. 15/383,170, dated Jul. 3, 2018; 10 pages.
Search Report in GB Patent Application No. GB1713267.1, dated Dec. 22, 2017; 5 pages.
Non-Final Office Action in U.S. Appl. No. 15/653,768, dated Jan. 10, 2018; 31 pages.
Non-Final Office Action in U.S. Appl. No. 15/641,367, dated Jan. 12, 2018; 9 pages.
Non-Final Office Action in U.S. Appl. No. 15/703,307, dated Jan. 18, 2018; 9 pages.
Search Report in GB Patent Application No. GB1713283.8, dated Dec. 22, 2017; 4 pages.
Non-Final Office Action in U.S. Appl. No. 16/238,705 dated Apr. 18, 2019; 7 pages.
Notice of Allowance in U.S. Appl. No. 15/433,365 dated Apr. 18, 2019; 5 pages.
Notice of Allowance and Fees Due in U.S. Appl. No. 15/433,388, dated May 21, 2019; 5 pages.
Restriction Requirement in U.S. Appl. No. 16/102,954 dated Jul. 3, 2019; 7 pages.
Notice of Allowance in U.S. Appl. No. 15/383,126 dated Jan. 15, 2019; 5 pages.
Non-Final Office Action in U.S. Appl. No. 15/433,365 dated Feb. 5, 2019; 8 pages.
Restriction Requirement in U.S. Appl. No. 15/676,143 dated Apr. 1, 2019; 6 pages.
Notice of Allowance in U.S. Appl. No. 16/239,064 dated Aug. 15, 2019; 13 pages.
Notice of Allowance in U.S. Appl. No. 16/238,705 dated Aug. 21, 2019; 5 pages.
Notice of Allowance in U.S. Appl. No. 15/676,143 dated Sep. 12, 2019; 8 pages.
Notice of Allowance in U.S. Appl. No. 16/102,954 dated Sep. 10, 2019; 8 pages.

* cited by examiner

SHOPPING CART BAGGING STATION AND METHOD OF FORMING THE SAME

CROSS REFERENCE TO RELATED APPLICATION

This application claims priority to U.S. provisional patent application Ser. No. 62/377,135, filed Aug. 19, 2016 to Applicant Wal-Mart Stores Inc., and entitled "Shopping Cart Bagging Station and method of Forming the Same", and this application claims priority to U.S. provisional patent application Ser. No. 62/377,143, filed Aug. 19, 2016 to Applicant Wal-Mart Stores Inc., and entitled "Shopping Cart Bagging Station and method of Forming the Same", which are both incorporated entirely herein by reference.

BACKGROUND OF THE INVENTION

Technical Field

This invention relates to retail store fixtures, and, more specifically, to a bagging station that couples to a shopping cart.

State of the Art

A bagging station is a fixture located in a retail store that holds a stack of shopping bags, often plastic shopping bags, and dispenses these bags as they are filled with products a customer has purchased. The shopping bags are held in a manner and position such that it is easy and convenient for a person to open one bag at a time, place purchased items in the bag, and then remove the bag and the enclosed products from the bagging station. Bagging stations have traditionally been located at checkout stations where customers pay for their products, because that is where the products have traditionally been transferred from a shopping cart to the shopping bags. With the advent of electronic purchasing and self-checkout, however, customers are now able to pay for and bag their products as they shop, and these actions can occur at locations other than at checkout stations. There is a need for bagging stations at locations in retail stores besides the checkout station.

Accordingly, what is needed is a bagging station that can be mounted in a shopping cart, so that customers can bag their purchases as they shop.

DETAILED DESCRIPTION OF EMBODIMENTS OF THE INVENTION

Figure 1:
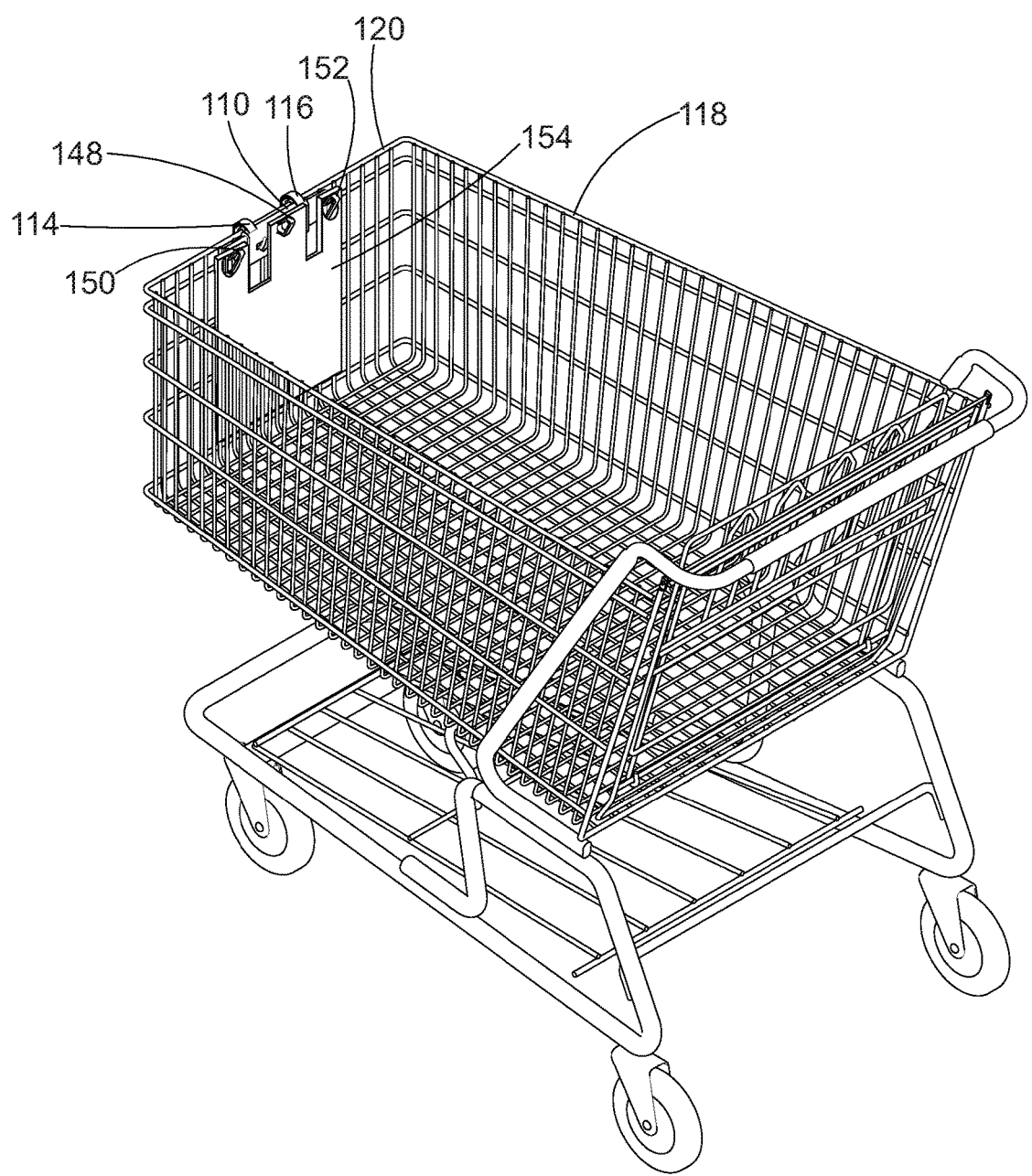
FIG. 1 shows a shopping cart bagging station coupled to a shopping cart.

Disclosed herein are embodiments of an invention related to retail store fixtures, and, more specifically, to a bagging station that couples to a shopping cart. The disclosed shopping cart bagging station can be used by customers to bag their purchases as they shop. The disclosed shopping cart bagging station includes a center piece, a first and a second handle arm assembly, and at least one cart coupling hook. The center piece includes a bag holder hook that at least one shopping bag hangs from. The first and the second handle arm assembly each include a handle holder arm that the arms of the at least one shopping bag hangs from. The first and the second handle arm assemblies slidingly insert into a hollow body of the center piece and are adjustably coupled to the center piece. The at least one cart coupler hook is coupled to the hollow body and are used to couple the shopping cart bagging station to a shopping cart. The bag holder hook and the handle holder arms hold a plurality of shopping bags, and dispense the shopping bags one at a time as products are placed in a shopping bag. The bagging station is coupled to the shopping cart so the bagging station can be easily used by a customer to bag their purchases as they shop. The shopping cart bagging station is coupled to a shopping cart by hanging the one or more cart coupler hooks on a side of the shopping cart. The shopping cart bagging station can be mounted in various locations on a shopping cart, making it easy and convenient for a customer to carry and load a plurality of shopping bags as they shop. The shopping cart bagging station can be hung in many different locations on a shopping cart, and is easily moved from one location to another one on the shopping cart. The disclosed shopping cart bagging station provides a means for a customer to load purchases into bags as they shop, instead of having to bag their purchases at a checkout station.

Disclosed herein is a shopping cart bagging station that includes a hollow body and a bag holder hook coupled to the hollow body. The bag holder hook is a means to hold a plurality of shopping bags. The shopping cart bagging station also includes a means to hold a first shopping bag handle, and a means to hold a second shopping bag handle. The means to hold the first and the second shopping bag handles are coupled to the hollow body. The shopping cart bagging station also includes a means to adjust a distance between the means to hold the first shopping bag handle and the means to hold the second shopping bag handle. The shopping cart bagging station also includes a means to couple the hollow body to a shopping cart. In some embodiments, the means to couple the hollow body to the shopping cart includes a first and a second cart coupler hook. In some embodiments, the shopping cart bagging station includes a means to adjust a second distance between the means to hold the first shopping bag handle and the bag holder hook. In some embodiments, the shopping cart bagging station includes a means to adjust a third distance between the means to hold the second shopping bag handle and the bag holder hook. The adjustability of the bagging station makes the bagging station easy to adjust to different size shopping bags, different sized shopping carts, and different mounting configurations. The means to hold a first and a second shopping bag handle and the means to adjust a distance between the means to hold the first and the second shopping bag handles can take many different forms, some examples of which are shown and described in this document. The examples shown and described are not meant to be limiting, and many other variations are possible in light of the teachings in this document.

Figure 2:
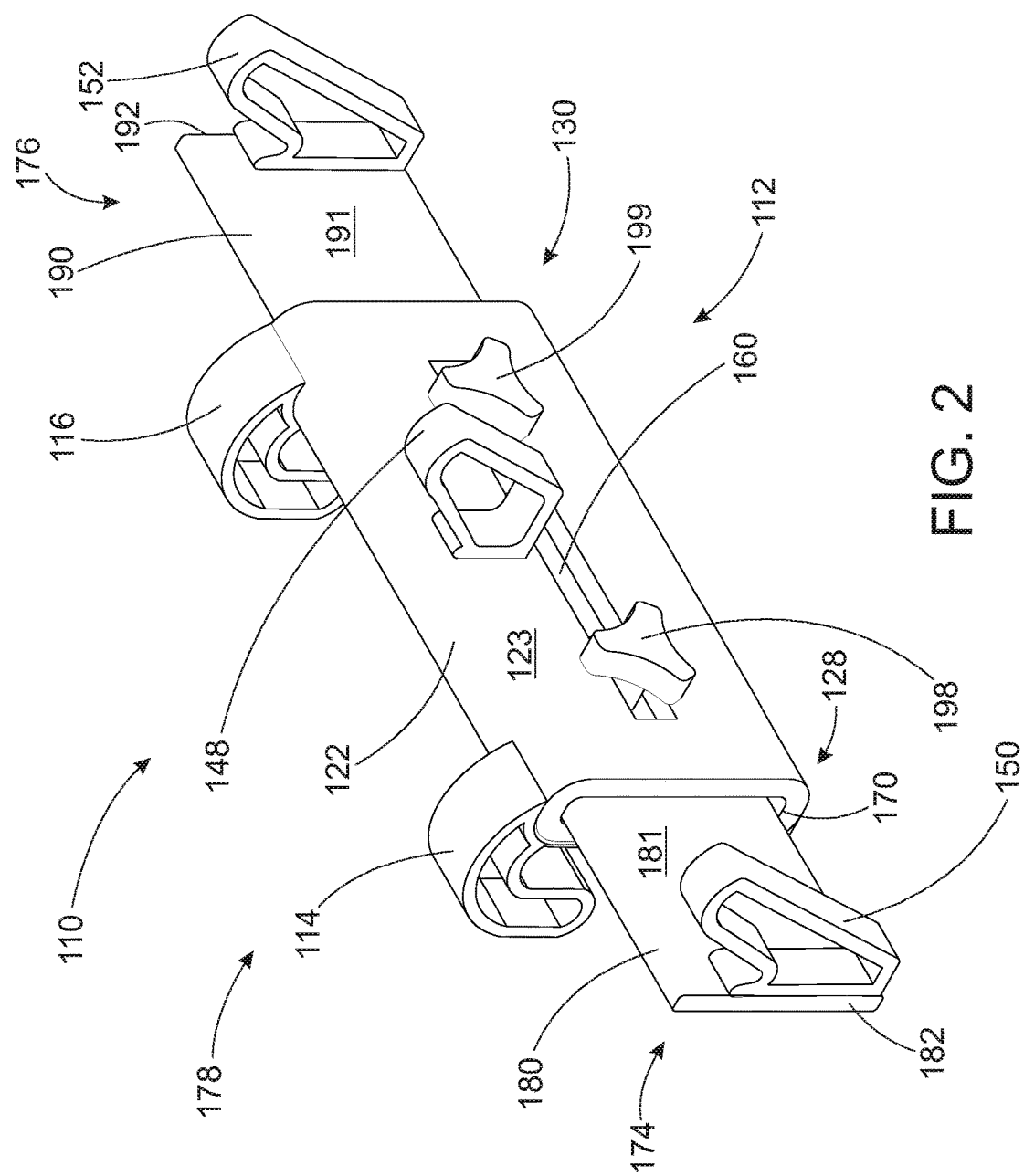
FIG. 2 shows a front perspective view of a shopping cart bagging station.
Figure 3:
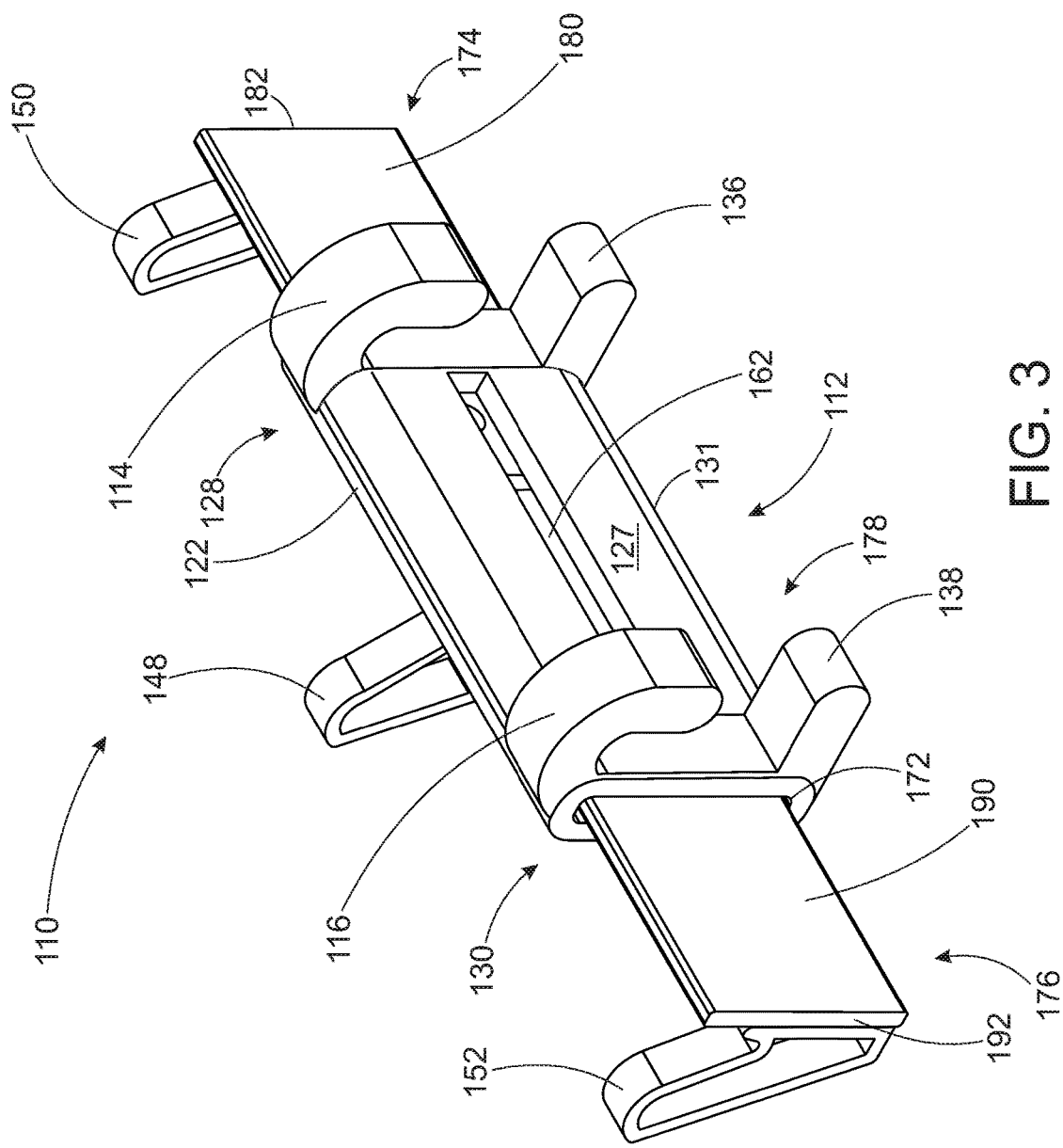
FIG. 3 shows a rear perspective view of the shopping cart bagging station of FIG. 2.
Figure 4:
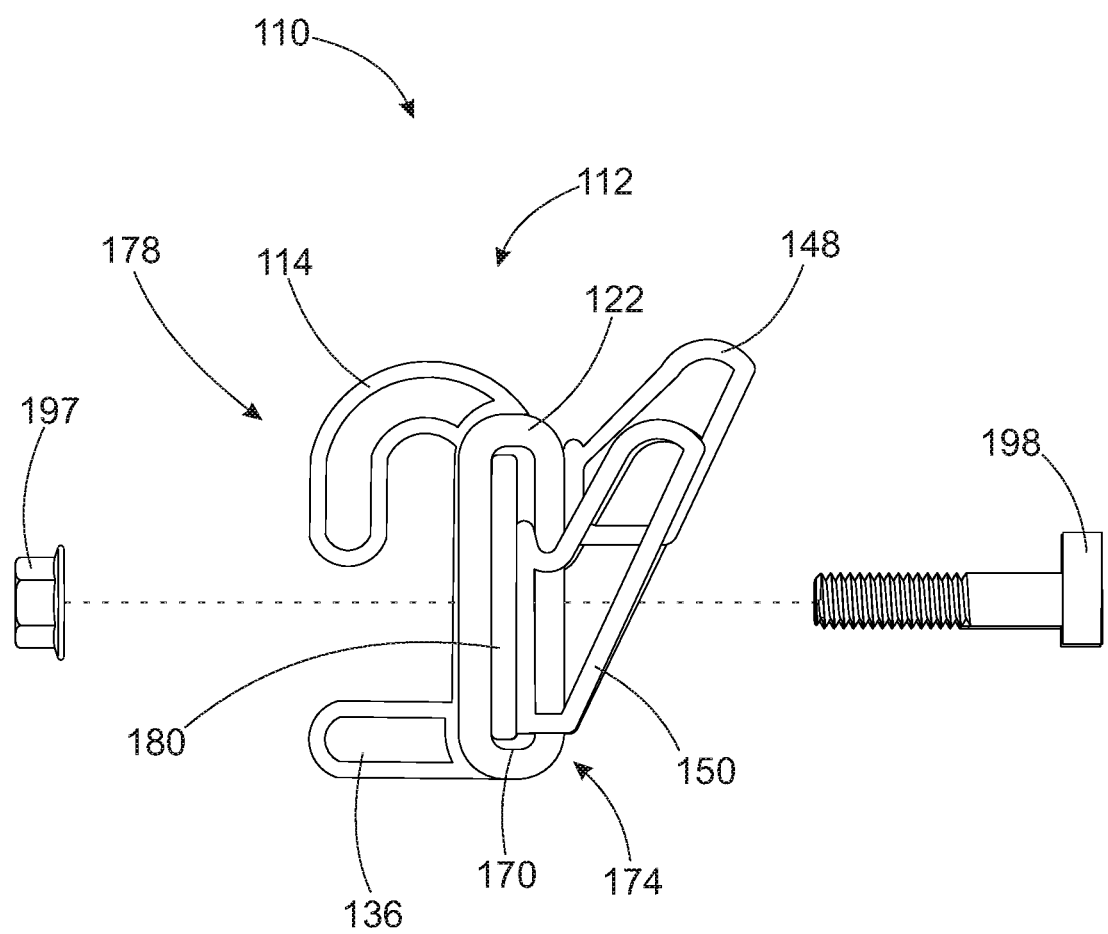
FIG. 4 is an exploded side view of the shopping cart bagging station of FIG. 2.
Figure 5:
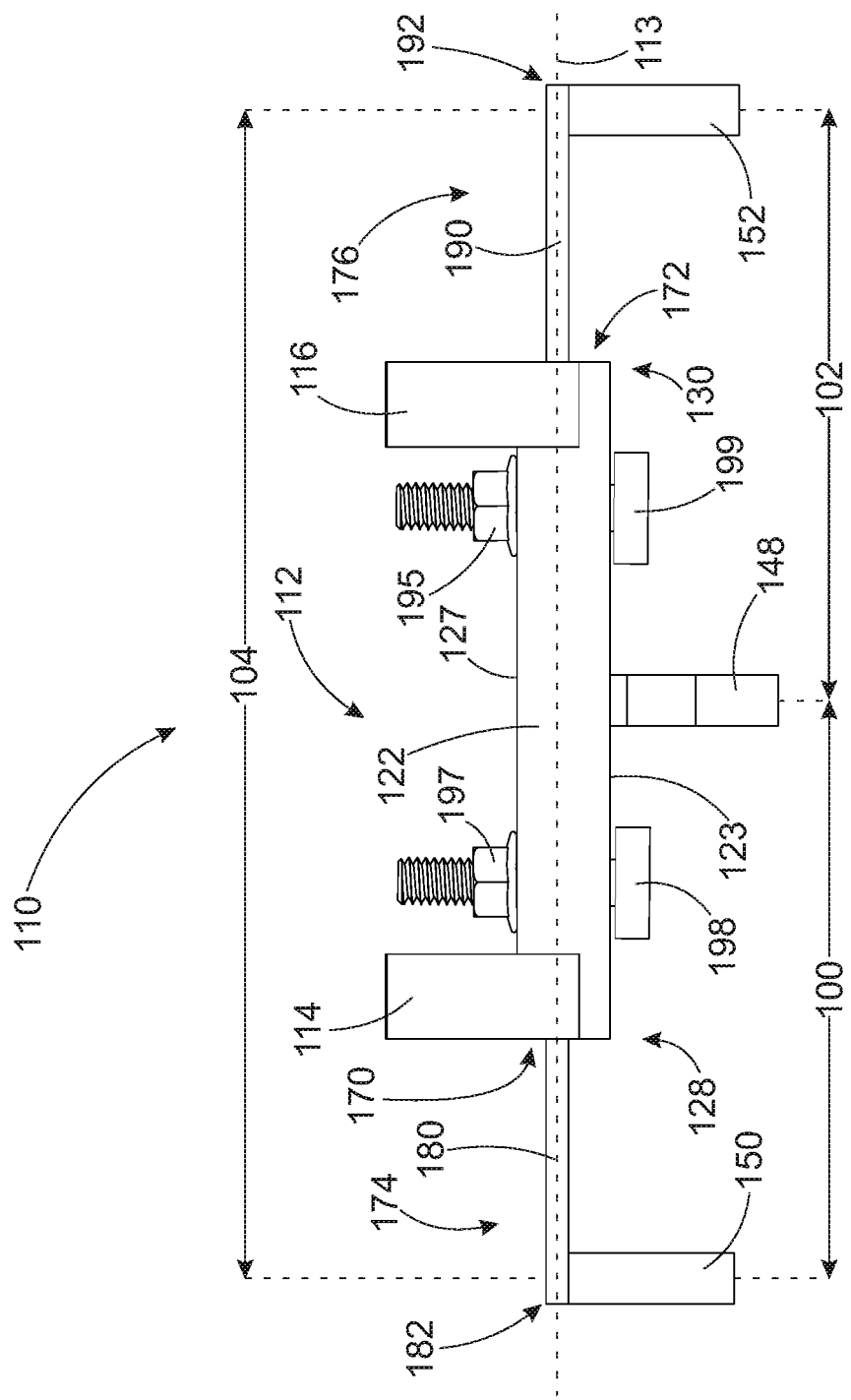
FIG. 5 is a top view of the shopping cart bagging station of FIG. 2.
Figure 6:
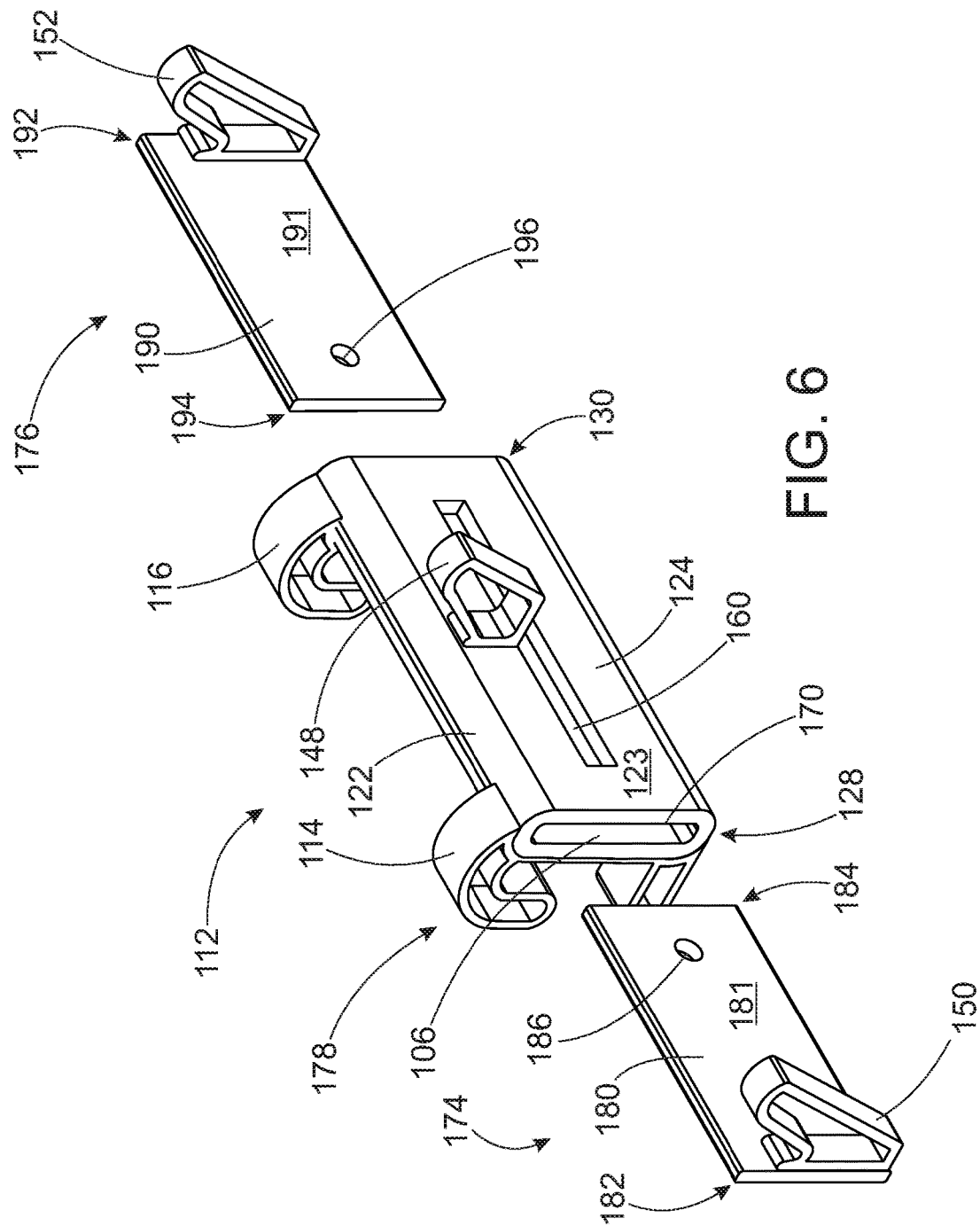
FIG. 6 shows a perspective view of the components of the shopping cart bagging station of FIG. 2.

FIG. 1 through FIG. 6 show an embodiment of a shopping cart bagging station 110. Shopping cart bagging station 110 includes a center piece 112, a first handle arm assembly 174, a second handle arm assembly 176, and a shopping cart coupler assembly 178, as shown in the figures. FIG. 1 shows a perspective view of shopping cart bagging station 110 coupled to a side 120 of a shopping cart 118. A plurality of shopping bags 154 is hung from shopping cart bagging station 110. FIG. 2 shows a front perspective view of shopping cart bagging station 110. FIG. 3 shows a rear perspective view of shopping cart bagging station 110. FIG. 4 shows a side exploded view of shopping cart bagging station 110. FIG. 5 shows a top view of shopping cart bagging station 110. FIG. 6 shows a perspective view of the components of shopping cart bagging station 110.

Shopping cart bagging station 110 is coupled to shopping cart 118 so that shopping cart bagging station 110 can be used to bag items while shopping. Shopping cart bagging station 110 is coupled to shopping cart 118 with shopping cart coupler assembly 178 (FIG. 2 and FIG. 3), which, in the embodiment shown in the figures, includes a first cart coupling hook 114 and a second cart coupling hook 116. First and second cart coupling hooks 114 and 116 are used to hang shopping cart bagging station 110 from shopping cart 118, as shown in FIG. 1. With cart coupling hooks 114 and 116 coupling bagging station 110 to shopping cart 118, bagging station 110 can be used by a customer to dispense bags as needed while the customer shops. A plurality of shopping bags 154 is hung from a bag holder hook 148 of shopping cart bagging station, as shown in FIG. 1. Handles of plurality of shopping bags 154 are hung from first and second handler holder arms 150 and 152, as shown in FIG. 1. When the customer wishes to fill a bag, one of the stack of shopping bags is pulled open and filled with items. First and second handle holder arms 150 and 152 hold the open bag and the items in the bag. When the bag is full, it is pulled off of shopping cart bagging station 110, and a next bag is opened if there are further items to be bagged. The customer can bag items as they shop instead of visiting a checkout station to pay for and bag their items.

Center piece 112 includes bag holder hook 148 that holds plurality of shopping bags 154. First handle holder arm assembly 174 includes first handle holder arm 150 that a shopping bag handle can be hung from. Second handle holder arm assembly 176 includes second handle holder arm 152 to hang a second shopping bag handle from. First and second handle holder arm assemblies 174 and 176 each adjustably and slidingly couple to center piece 112 so that bagging station 110 can be adjusted in size for different size shopping bags and different size shopping carts.

In the embodiment shown in FIG. 1 through FIG. 6, center piece 112 and first and second handle holder arm assembly 174 and 176 are a means to dispense shopping bags. First handle holder arm assembly 174 with first handle holder arm 150 is a means to hold a first shopping bag handle. Second handle holder arm assembly 176 with second handle holder arm 152 is a means to hold a second shopping bag handle. In this embodiment, center piece 112 with bag holder hook 148 is a means to hold plurality of shopping bags 154, and first and second handle holder arm assemblies 174 and 176 with first and second handle holder arms 150 and 152 are means to hold shopping bag handles.

Figure 7:
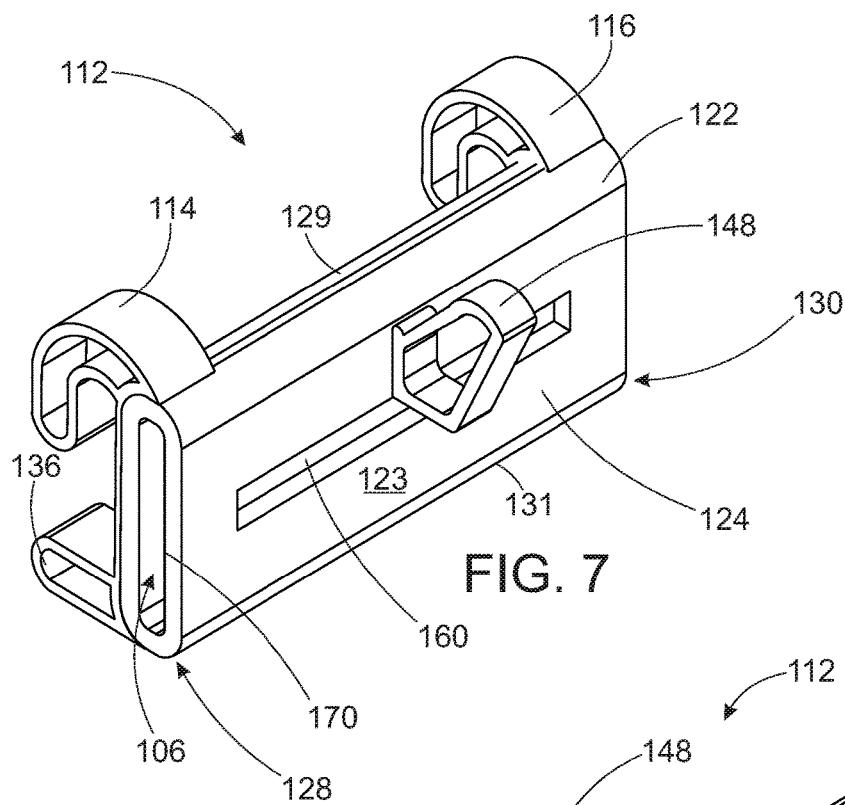
FIG. 7 shows a front perspective view of a center piece of the shopping cart bagging station of FIG. 2.
Figure 8:
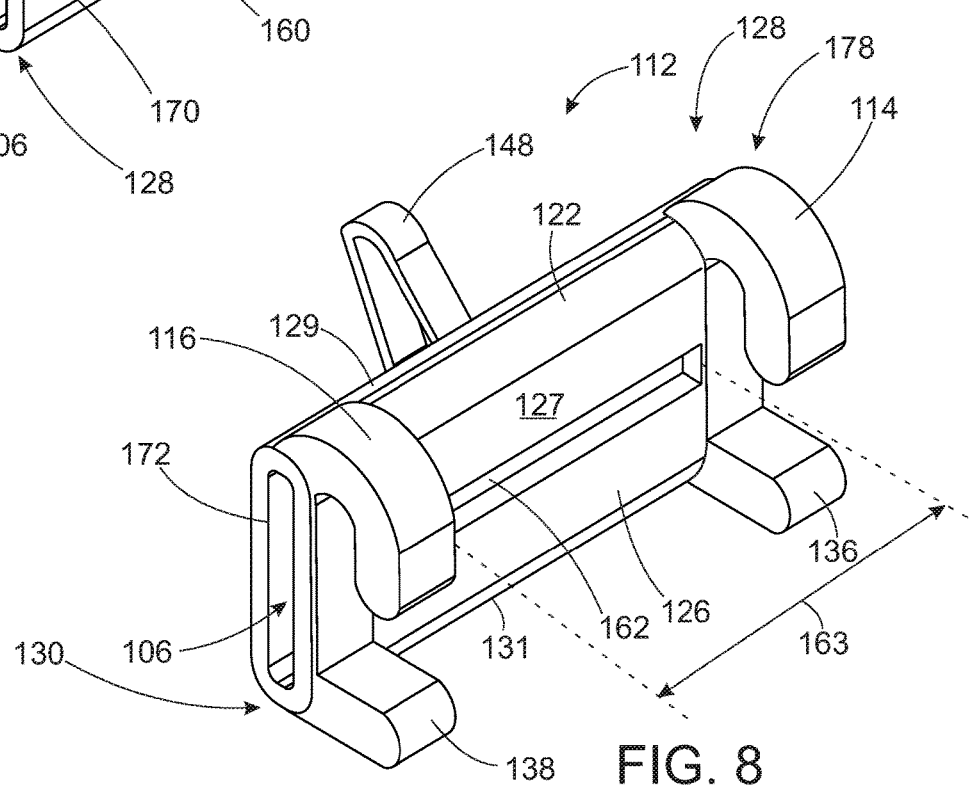
FIG. 8 shows a rear perspective view of the center piece of the shopping cart bagging station of FIG. 2.
Figure 9:
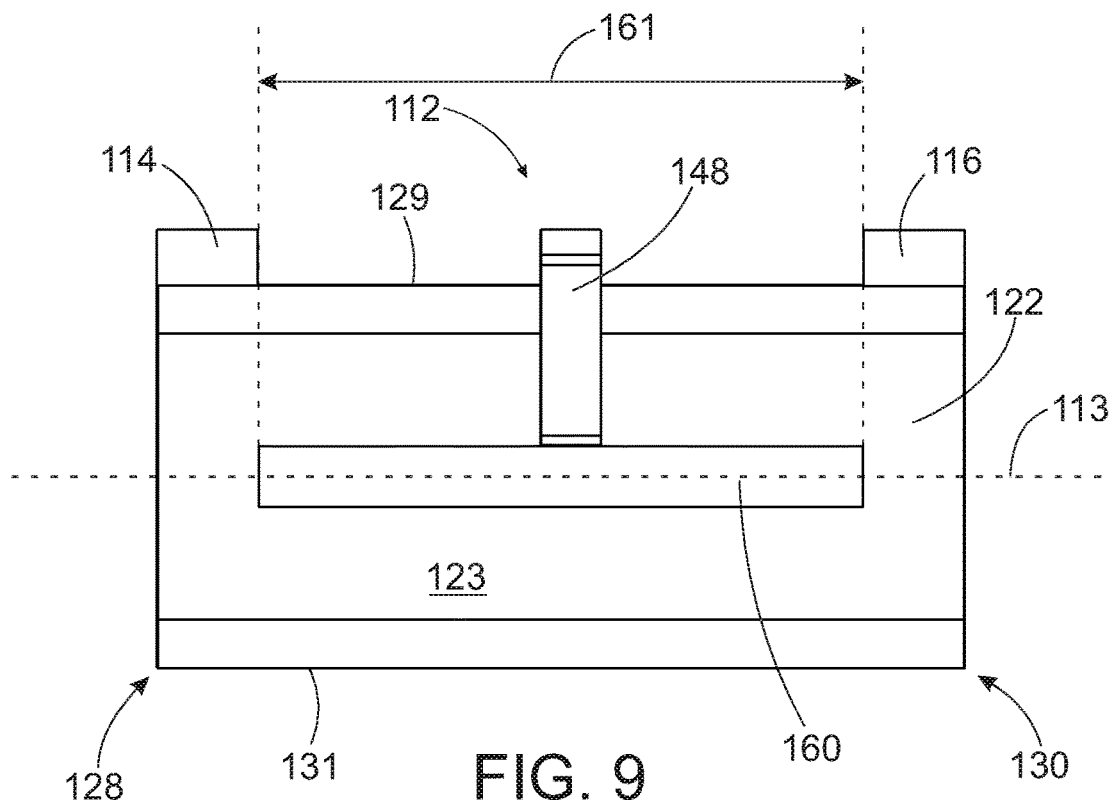
FIG. 9 shows a front view of the center piece of the shopping cart bagging station of FIG. 2.
Figure 10:
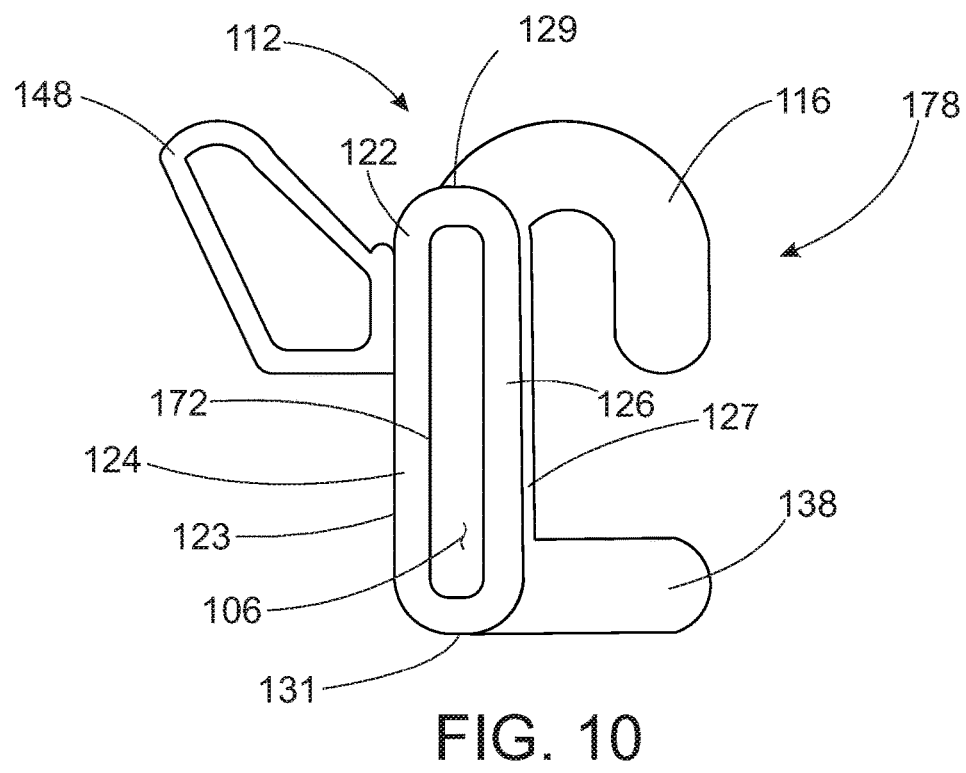
FIG. 10 shows a side view of the center piece of the shopping cart bagging station of FIG. 2.

Center piece 112 is shown in detail in FIG. 7, FIG. 8, FIG. 9, and FIG. 10. FIG. 7 shows a front perspective view of center piece 112. FIG. 8 shows a rear perspective view of center piece 112. FIG. 9 shows a front view of center piece 112, and FIG. 10 shows a side view of center piece 112.

Center piece 112 includes a hollow body 122 surrounding a cavity 106 (cavity 106 best seen in FIG. 10). Hollow body 122 has a front side 124 and a rear side 126. Front side 124 and rear side 126 define cavity 106 therebetween. Front side 124 has a front surface 123. Rear side 126 has a rear surface 127, see FIG. 10, for example. Hollow body 122 has a first slot opening 160 extending through front side 124 of hollow body 122 from front surface 123 to cavity 106, as best seen in FIG. 2, FIG. 6 and FIG. 7. Hollow body 122 also has a second slot opening 162 extending through rear side 126 of hollow body 122 from rear surface 127 to cavity 106, as best seen in FIG. 3 and FIG. 8. Center piece 112 has a hollow body first end 128 with a first opening 170 into hollow body 122 (FIG. 7). Center piece 112 also has a hollow body second end 130 opposing first end 128. Second end 130 has an opening 172 into hollow body 123 (FIG. 8 and FIG. 10). Center piece 112 includes bag holder hook 148 coupled to front surface 123 of hollow body 122. Hollow body 122 in this embodiment has a cross-section in the shape of a compressed hollow cylinder, as best seen in FIG. 10. This oval-shaped cross section is advantageous for receiving first and second handle arm assemblies 174 and 176, as explained herein.

First and second handle arm assemblies 174 and 176 adjustably couple to hollow body 122 of center piece 112. First handle arm assembly 174 includes a first handle arm plate 180 and first handle holder arm 150 coupled to a first handle arm plate distal end 182 of first handle arm plate 180, see FIG. 6 for example. First handle holder arm 150 is hook-shaped to hang a shopping bag handle from. First handle holder arm 150 is coupled to a first handle arm plate front surface 181, and faces a hollow body top edge 129. First handle holder arm 150 facing hollow body top edge 129 means the hook of first handle holder arm 150 bends upwards facing top edge 129. Having first handle holder arm 150 face hollow body top edge 129 allows first handle holder arm 150 to hold the handles of one or more shopping bags without the shopping bag handles falling off.

First handle arm assembly 174 also includes a first handle arm plate hole 186 at a first handle arm plate proximal end 184 of first handle arm plate 180, as shown in FIG. 6. First handle arm plate proximal end 184 extends into hollow body 122 through first opening 170 to adjustably couple first handle arm assembly 174 to center piece 112 and to hollow body 122. First handle arm plate distal end 182 opposes first handle arm plate proximal end 184. First handle arm assembly 174 is removeably and adjustably coupled to hollow body 122 by inserting first handle arm plate proximal end 184 into hollow body 122 through first opening 170 (FIG. 5, FIG. 6 and FIG. 7), as shown in FIG. 2 through FIG. 6. First handle arm plate 180 slides into and out of hollow body 122 along a center piece longitudinal axis 113 (FIG. 5) to adjust a distance 100 between first handle holder arm 150 and bag holder hook 148, as shown in FIG. 5. Center piece longitudinal axis 113 extends longitudinally along center piece 112 from hollow body first end 128 to hollow body second end 130, as shown in FIG. 5 and FIG. 9. Adjusting distance 100 allows bagging station 110 to adjust to different size shopping bags and different size shopping carts. A coupler 198 is used to adjustably couple first handle arm assembly 174 to hollow body 122. Coupler 198 is used to fix first handle arm assembly 174 in place in hollow body 122. Coupler 198 is a threaded butterfly bolt in this embodiment, but can be other types of bolts, threaded couplers, or another type of coupler. Coupler 198 extends through first slot opening 160 (FIG. 2, FIG. 6 and FIG. 7), through first handle arm plate hole 186 (FIG. 6), and through second slot opening 162 (FIG. 3 and FIG. 8) as shown in FIG. 4 and FIG. 5. Tightening a nut 197 on threads of coupler 198 fixes first handle arm plate 180 in hollow body 122. First slot opening 160 has a first slot length 161 and extends along center piece longitudinal axis 113 (FIG. 9). Second slot opening 162 has a second slot length 163 and also extends along center piece longitudinal axis 113 (FIG. 5 and FIG. 8). Coupler 198 sliding along first and second slot openings 160 and 162 slides first handle arm assembly 174 in and out of hollow body 122 along center piece longitudinal axis 113. With nut 197 loose on coupler 198, coupler 198 slides along first and second slot openings 160 and 162, which allows first handle arm assembly 174 to slide into and out of hollow body 122 to adjust distance 100. Tightening nut 197 fixes first handle arm assembly 174 in place.

Similarly, second handle arm assembly 176 includes a second handle arm plate 190 and second handle holder arm 152 coupled to a second handle arm plate distal end 192 of first handle arm plate 190. Second handle holder arm 152 is coupled to a second handle arm plate front surface 191 and faces hollow body top edge 129. Having second handle holder arm 152 face hollow body top edge 129 allows second handle arm 152 to hold handles of one or more shopping bags without the handles sliding off of second handle holder arm 152.

Figure 11:
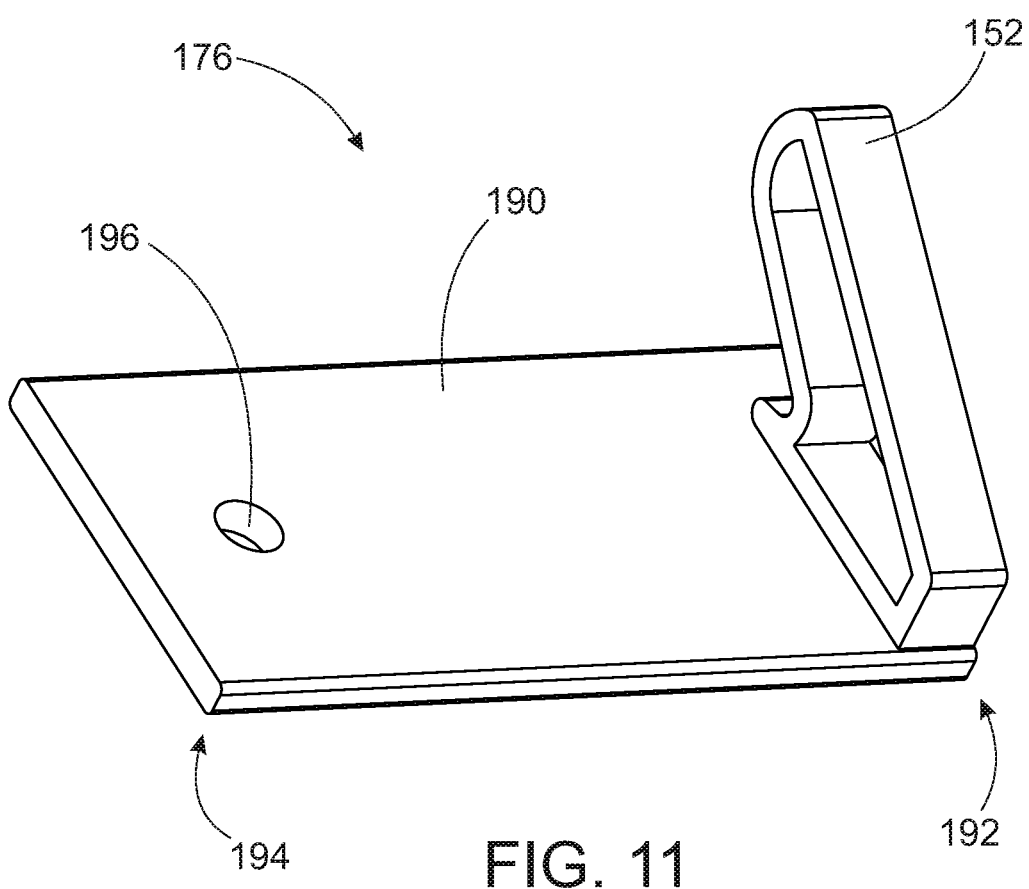
FIG. 11 shows a front perspective view of a handle arm assembly of the shopping cart bagging station of FIG. 2.

Second handle arm assembly 176 also includes a second handle arm plate hole 196 at a second handle arm plate proximal end 194 of second handle arm plate 190, as shown in FIG. 5, FIG. 6 and FIG. 11. FIG. 11 shows a front perspective view of second handle arm assembly 176. Second handle arm plate proximal end 194 extends into hollow body 122 through second opening 172 to adjustably couple second handle arm assembly 176 to center piece 112 and to hollow body 122. Second handle arm plate distal end 192 opposes second handle arm plate proximal end 194. Second handle arm assembly 176 is removeably and adjustably coupled to hollow body 122 by inserting second handle arm plate proximal end 194 of second handle arm plate 190 into hollow body 122 through second opening 172 (FIG. 5 and FIG. 8), as shown in FIG. 2 through FIG. 6. Second handle arm plate 190 slides into and out of hollow body 122 along center piece longitudinal axis 113 to adjust a distance 102 between second handle holder arm 152 and bag holder hook 148, as shown in FIG. 5. Adjusting distance 102 allows bagging station 110 to adjust to different size shopping bags and different size shopping carts. A coupler 199 is used to adjustably and removeably couple second handle arm assembly 176 to hollow body 122. Coupler 199 is used to fix second handle arm assembly 176 in place in hollow body 122. Coupler 199 is a threaded butterfly bolt in this embodiment, but this is not meant to be limiting. Coupler 199 extends through first slot opening 160 (FIG. 6 and FIG. 7), through second handle arm plate hole 186 (FIG. 6 and FIG. 11), and through second slot opening 162 (FIG. 8) as shown in FIG. 4 and FIG. 5. Tightening a nut 195 on threads of coupler 199 fixes second handle arm plate 190 in hollow body 122. Coupler 198 sliding along first and second slot openings 160 and 162 slides second handle arm assembly 176 in and out of hollow body 122 along center piece longitudinal axis 113. With nut 195 loose on coupler 199, coupler 199 slides along first and second slot openings 160 and 162, which allows second handle arm assembly 176 to slide into and out of hollow body 122 to adjust distance 102. Tightening nut 195 fixes second handle arm assembly 176 in place.

Thus, both first and second handle arm assemblies 174 and 176 slidingly couple to hollow body 122 such that distances 100 and 102 are adjustable. Once distance 100 and 102 are adjusted as desired, couplers 198 and 199 are tightened using nuts 195 and 197 to fix distance 100 and 102. Adjusting distance 100 and 102 also adjusts a distance 104 between first and second handle holder arms 150 and 152, as shown in FIG. 5. Thus, first and second handle holder arm assemblies 174 and 176 are both adjustably coupled to hollow body 122 such that distance 104 between first handle holder arm 150 and second handle holder arm assembly 152 is adjustable, as shown in FIG. 5.

Slot openings 160 and 162 in hollow body 122 and couplers 198 and 199 provide adjustability and options for mounting shopping cart bagging station 110 to different positions in shopping cart 118. Slot openings 160 and 162, together with first and second handle arm assemblies 174 and 176, are a means to adjust distance 104 between first and second handle holder arms 150 and 152. Slot openings 160 and 162, together with first and second handle arm assemblies 174 and 176, are also a means to adjust distance 100 between first handle holder arm 150 and bag holder hook 148, and a means to adjust distance 102 between second handle holder arm 152 and bag holder hook 148. It is to be understood that couplers other than bolt couplers 198 and 199 are used in some embodiments of shopping cart bagging station 110.

Shopping cart coupler assembly 178 couples bagging station 110 to shopping cart 118. Shopping cart coupler assembly 178 is a means to couple center piece 112 and hollow body 122 to shopping cart 118. Shopping cart coupler assembly 178 in the embodiment shown in the figures includes first cart coupling hook 114 and second cart coupling hook 116, as best seen in FIG. 3. First and second cart coupling hooks 114 and 116 are hook-shaped protrusions coupled to, and extending from, rear surface 127 of rear side 126 of hollow body 122. First and second cart coupling hooks 114 and 116 extend from rear surface 127 of rear side 126 (FIG. 8) and face a hollow body bottom edge 131. First and second cart coupling hooks 114 and 116 facing hollow body bottom edge 131 means the hook shapes bend towards hollow body bottom edge 131 so that first and second cart coupling hooks 114 and 116 can hang on shopping cart 118 to couple shopping cart bagging station 110 to shopping cart 118. First and second cart coupling hooks 114 and 116 hook onto, or hang on, a rod of shopping cart 118. First and second cart coupling hooks 114 and 116 can hook to a rod of shopping cart 118 in many different locations on shopping cart 118 so that a customer can couple bagging station 110 to a location on shopping cart 118 that is convenient for them.

In the embodiment shown in the figures, shopping cart coupler assembly 178 also includes a first post 136 and a second post 138, see FIG. 8. First and second posts 136 and 138 are straight elongate protrusions from rear surface 127 that extend perpendicular to rear surface 127. First post 136 extends from rear surface 127 near first cart coupling hook 114. Second post 138 extends from rear surface 127 near second cart coupling hook 116. First and second posts 136 and 138 help bagging station 110 couple to shopping cart 118, and, in some embodiments, help keep hollow body 122 aligned parallel to side 120 of shopping cart 118. It is to be understood that shopping cart coupler assembly 178 can take many other forms for specific shopping carts and/or mounting configurations of bagging station 110.

With cart coupling hooks 114 and 116 coupling bagging station 110 to shopping cart 118, bagging station 110 can be used by a customer to dispense bags as needed while the customer shops. Shopping cart bagging station 110 can be coupled to many positions within shopping cart 118. FIG. 1 shows shopping cart bagging station 110 coupled to a front side 120 of shopping cart 118, but this is not mean to be limiting. Shopping cart bagging station 110 can be coupled to the interior or exterior of shopping cart 118. Shopping cart bagging station 110 can be coupled to the front, sides, rear, edges, or bottom of shopping cart 118. In some embodiments, the shopping cart will take a form other than shopping cart 118, and the means to couple bagging station 110 to the shopping cart will take another form consistent with the form of the shopping cart.

Figure 12:
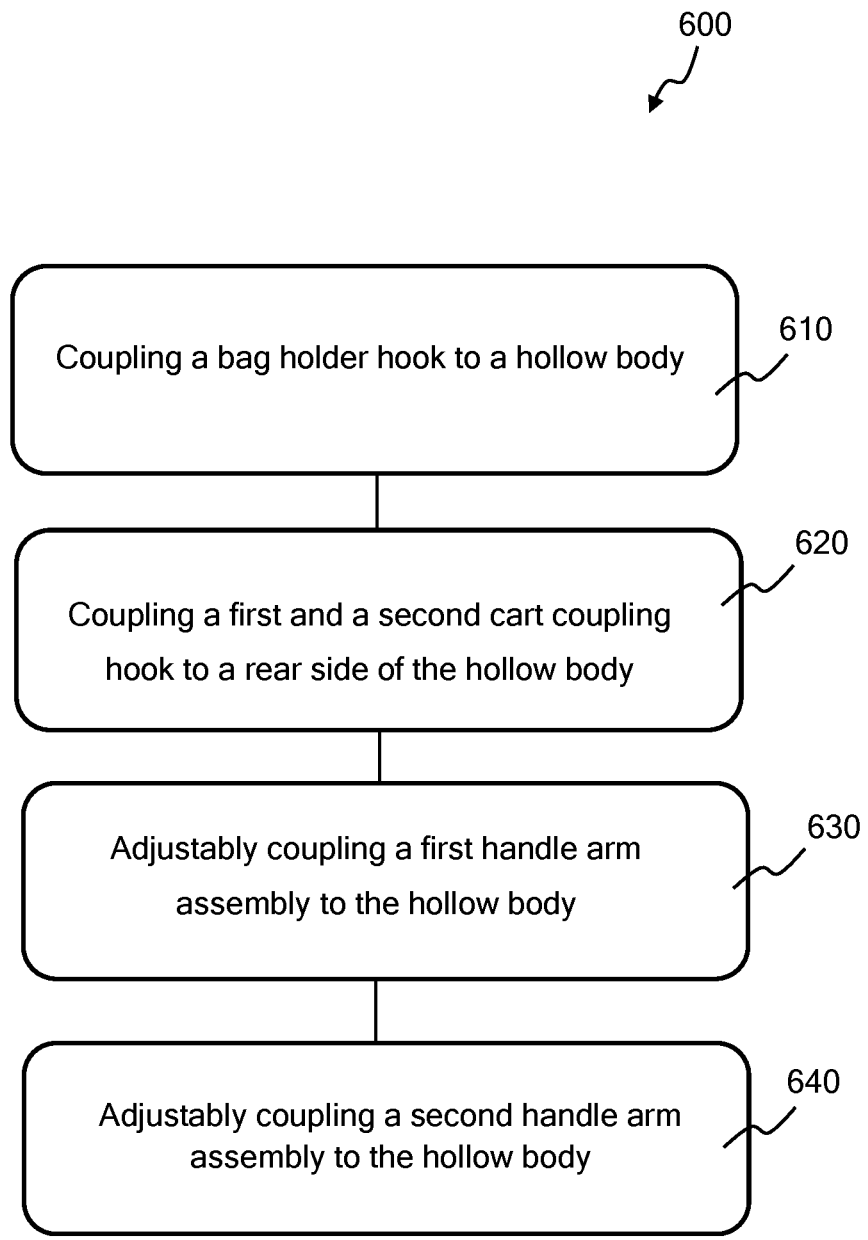
FIG. 12 illustrates a method of forming a shopping cart bagging station.

FIG. 12 illustrates a method 600 of forming a shopping cart bagging station. Method 600 includes an act 610 of coupling a bag holder hook to a hollow body. The hollow body includes a hollow body having a front side and a rear side, a hollow body first end having a first opening in the hollow body, and a hollow body second end having a second opening in the hollow body.

Method 600 also includes an act 620 of coupling a first and a second cart coupling hook to a rear side of the hollow body. The first and the second cart coupling hook face a hollow body bottom edge.

Method 600 also includes an act 630 of adjustably coupling a first handle arm assembly to the hollow body. The first handle arm assembly includes a first handle holder arm. The first handle holder arm extends from a hollow body rear surface and faces a bottom edge of the hollow body. In some embodiments, act 630 of adjustably coupling the first handle arm assembly to the hollow body includes sliding a first handle arm plate proximal end through the first opening. The first handle arm assembly slides into and out of the hollow body to adjust a distance between the first handle holder arm and the bag holder hook.

Method 600 also includes an act 640 of adjustably coupling a second handle arm assembly to the hollow body. The second handle arm assembly includes a second handle holder arm. The second handle holder arm extends from the hollow body rear surface and faces the bottom edge of the hollow body. In some embodiments, act 640 of adjustably coupling the second handle arm assembly to the hollow body includes sliding a second handle arm plate proximal end through the second opening. The second handle arm assembly slides into and out of the hollow body to adjust a distance between the second handle holder arm and the bag holder hook. A distance between the first handle holder arm and the second handle holder arm is adjustable by sliding the first and the second handle arm assemblies into and out of the hollow body In some embodiments, method 600 includes coupling the first handle holder arm to a first handle arm plate distal end. In some embodiments, method 600 includes coupling the second handle holder arm to a second handle arm plate distal end.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A shopping cart bagging station comprising:
   at least one shopping bag;
   a center piece comprising:
      a hollow body;
      a first opening in the hollow body at a hollow body first end;
      a second opening in the hollow body at a hollow body second end; and
      a bag holder hook for hanging the at least one shopping bag coupled to a hollow body front surface;
   a first handle arm assembly for holding a first handle of the at least one shopping bag which comprises:
      a first handle arm plate having a first handle arm plate proximal end and a first handle arm plate distal end, wherein the first handle arm plate proximal end extends into the hollow body through the first opening to couple the first handle arm assembly to the center piece; and
      a first handle holder arm coupled to the first handle arm plate distal end;
   a second handle arm assembly for holding a second handle of the at least one shopping bag which comprises:
      a second handle arm plate having a second handle arm plate proximal end and a second handle arm plate distal end, wherein the second handle arm plate proximal end extends into the hollow body through the second opening to couple the second handle arm assembly to the center piece; and
      a second handle holder arm coupled to the second handle arm plate distal end; and at least one cart coupling hook coupled to a hollow body rear surface and facing a hollow body bottom edge, wherein the center piece further comprises:
   a center piece longitudinal axis extending from the hollow body first end to the hollow body second end;
   a first slot opening through a hollow body front side having a first slot length extending along the center piece longitudinal axis; and
   second slot opening through a hollow body rear side having a second slot length extending along the center piece longitudinal axis.

2. The shopping cart bagging station of claim 1, wherein the first and the second handle arm plates slide into and out of the center piece along the center piece longitudinal axis.

3. The shopping cart bagging station of claim 2, wherein the first handle arm assembly is adjustably coupled to the hollow body and wherein a first distance between the first handle holder arm and the bag holder hook is adjustable.

4. The shopping cart bagging station of claim 3, wherein the second handle arm assembly is adjustably coupled to the hollow body and wherein a second distance between the second handle holder arm and the bag holder hook is adjustable.

5. The shopping cart bagging station of claim 4, wherein a third distance between the first handle holder arm and the second handle holder arm is adjustable.

6. The shopping cart bagging station of claim 2, wherein a coupler extends through the first slot opening, a first handle arm plate hole, and the second slot opening to couple the first handle arm assembly to the hollow body.

7. The shopping cart bagging station of claim 6, wherein the coupler slides along the first slot opening and the second slot opening to adjustably couple the first handle arm assembly to the hollow body.

8. The shopping cart bagging station of claim 1, wherein the hollow body has a cross-section in the shape of a compressed hollow cylinder.

9. The shopping cart bagging station of claim 1, wherein the hollow body has an oval cross-section.

10. A shopping cart bagging station comprising:
at least one shopping bag;
a center piece which comprises:
  a hollow body having a hollow body front side and a hollow body rear side;
  a hollow body first end having a first opening in the hollow body;
  a hollow body second end having a second opening in the hollow body; and
  a bag holder hook for hanging the at least one shopping bag coupled to the hollow body front side;
a first handle arm assembly for holding a first handle of the at least one shopping bag which comprises:
  a first handle arm plate having a first handle arm proximal end and a first handle arm distal end, wherein the first handle arm assembly removeably and adjustably couples to the hollow body in response to the first handle arm proximal end being inserted in the hollow body through the first opening; and
  a first handle holder arm coupled to the first handle arm plate distal end;
a second handle arm assembly for holding a second handle of the at least one shopping bag which comprises:
  a second handle arm plate having a second handle arm proximal end and a second handle arm distal end, wherein the second handle arm assembly removeably and adjustably couples to the hollow body in response to the second handle arm proximal end being inserted in the hollow body through the second opening; and
  a second handle holder arm coupled to the second handle arm plate distal end;
a first cart coupling hook coupled to the hollow body rear side and facing a hollow body bottom edge; and
a second cart coupling hook coupled to the hollow body rear side and facing the hollow body bottom edge.

11. The shopping cart bagging station of claim 10, wherein the first handle holder arm is coupled to a first handle arm plate front surface, and wherein the first handle holder arm faces a hollow body top edge.

12. The shopping cart bagging station of claim 10, wherein a distance between the first handle holder arm and the second handle holder arm is adjustable.

13. The shopping cart bagging station of claim 10, wherein the first and the second handle arm assembly slide into and out of the hollow body along a center piece longitudinal axis.

14. The shopping cart bagging station of claim 13, wherein the hollow body further comprises:
a first slot opening through a hollow body front side having a first slot length extending along the center piece longitudinal axis; and
a second slot opening through a hollow body rear side having a second slot length extending along the center piece longitudinal axis.

15. The shopping cart bagging station of claim 14, wherein a coupler extends through the first slot opening, a hole through the first handle arm plate, and the second slot opening to couple the first handle arm assembly to the hollow body.

16. The shopping cart bagging station of claim 10, wherein the hollow body has a cross-section in the shape of a compressed hollow cylinder.

\* \* \* \* \*